3,486,299
APPARATUS AND METHOD FOR CONTINUOUS VAPOR PHASE FRACTIONATION
Herman J. Weiser, Jr., and Jerry E. Davis, Cincinnati, Ohio, assignors to The Procter & Gamble Company, Cincinnati, Ohio, a corporation
Filed July 6, 1967, Ser. No. 651,497
Int. Cl. B01d 15/08
U.S. Cl. 55—67                                              7 Claims

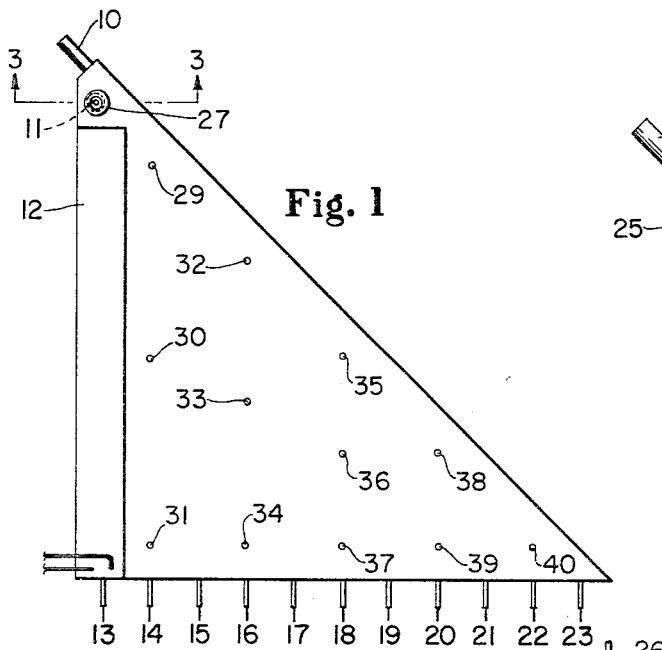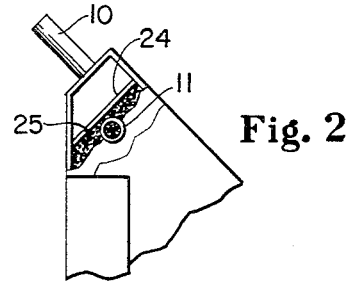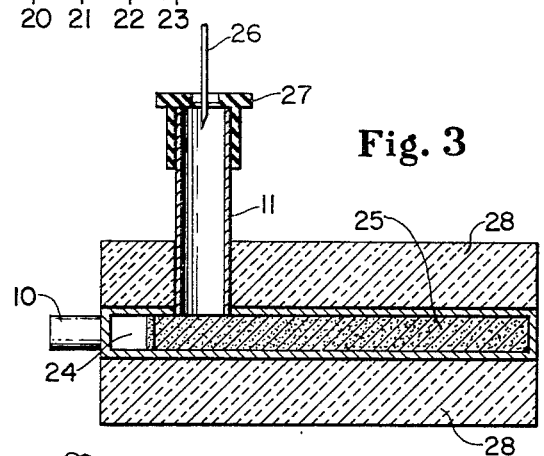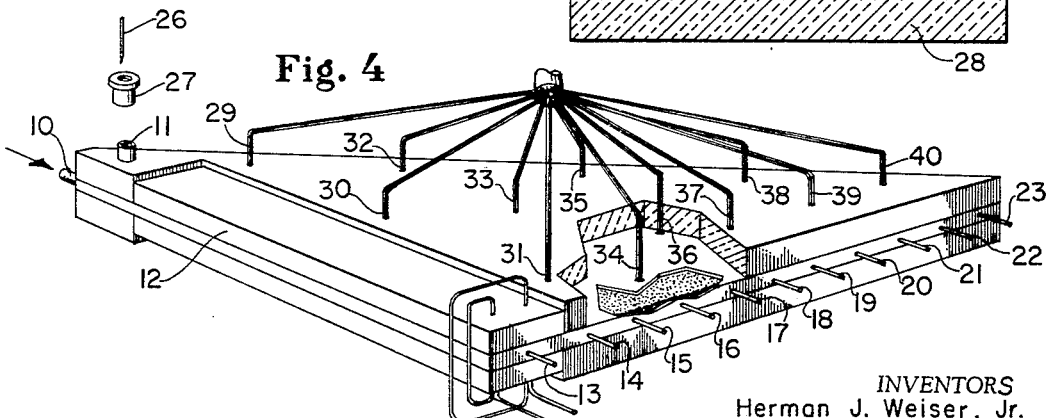
INVENTORS
Herman J. Weiser, Jr.
Jerry E. Davis
BY
ATTORNEY United States Patent Office 3,486,299
Patented Dec. 30, 1969

ABSTRACT OF THE DISCLOSURE

A method for continuous fractionation of a mixture of substances having different physical and/or chemical properties involving passing the mixture in vapor phase through a selective sorbent, while simultaneously applying a thermal gradient transversely through the path of the mixture through the sorbent, and apparatus to accomplish same.

---

The use of gas chromatography, or "vapor fractometry" as it is termed herein, as an analytical tool has developed to a high degree of sophistication. Conventional vapor fractometry involves passing a vaporized sample mixture through a column of chromatographic packing material comprising either an adsorptive solid (elution-adsorption) or an inert solid support coated with a high boiling liquid partitioning agent (elution-partition). In either case, separation of the components of the sample mixture results from selective sorption and desorption of the component by the column packing such that the components are ejected sequentially from the column.

Conventional vapor fractometry using standard apparatus involves the introduction of a "slug" of the sample mixture into the feed inlet of a tubular column with a carrier gas. Since elution of the sample components is a sequential process, the conventional methods are inherently discontinuous. Thus, conventional vapor fractometry methods are generally adapted to only batch separation.

Continuous fractionation of sample mixtures is of special value for process monitoring or preparative purposes. While considerable work has been done to provide apparatus and methods for continuous separation of sample mixtures, such apparatus and methods as have been developed are undesirably complicated, expensive and/or inefficient.

It is therefore an object of this invention to provide improved apparatus and methods for separating the components of chemical mixtures.

It is a further object of this invention to provide improved apparatus and methods for continuous fractionation of chemical mixtures in the vapor phase.

These and other objects are accomplished by the present invention as set forth in the following detailed description and the accompanying drawing.

In general terms, the method of the present invention involves the simultaneous application of two intersecting forces, i.e., thermal and sorptive, to a stream of a vaporized mixture sample in a carrier gas, to effect continuous separation of components having differing physical and/or chemical properties such as vapor pressure, solubility, or acidity. More specifically, it is a method for continuous fractionation of a sample mixture of substances having differing chemical and/or physical properties which comprises (a) continuously passing a carrier gas stream of said sample mixture in vapor phase through a sorbent, and (b) simultaneously, maintaining a thermal gradient in said sorbent transversely through the path of the carrier gas stream of sample mixture, and (c) collecting the effluent from at least two outlets along the thermal gradient axis.

Apparatus suitable for carrying out the process of this invention can be described in general terms as a chamber containing a sorbent packing, having a configuration which permits provision and maintenance of a thermal gradient in a path transverse to the flow of a carrier gas and vapor sample through the chamber, and having a sample and carrier gas inlet at one end, a plurality of outlets at the other end, and heating means disposed to provide the requisite thermal gradient between said inlets and outlets.

More particularly, the apparatus of this invention comprises a chamber containing a sorbent and having a carrier gas inlet, a sample inlet, a plurality of outlets, and heating means positioned between said sample inlet and outlets to provide a thermal gradient along an axis intersecting a straight line joining said sample inlet and outlets.

The apparatus and method of this invention can be best described by reference to the attached drawing wherein:

FIGURE 1 is a plan view of a vapor fractometry apparatus of representative configuration in accordance with this invention.

FIGURE 2 is an enlarged fragmentary plan view, partially broken away in order to show the gas diffusion strip and interior inlet features.

FIGURE 3 is a cross sectional view taken along line 3—3 of FIGURE 1, showing the sample and carrier gas inlets.

FIGURE 4 is a perspective view of a preferred apparatus, partially broken away in order to show its various internal elements.

Referring now to FIGURE 1, a typical embodiment of the fractionation apparatus of this invention is depicted having a flat right triangular shaped chamber equipped with a carrier gas inlet 10 at one corner of the chamber, a sample inlet 11 located on top of the chamber at the same corner, and a plurality of outlets 13 through 23 substantially evenly spaced along the side opposite the corner on which the carrier gas and sample inlets 10 and 11 are placed. A heating element 12 is attached to the chamber, running substantially the full length of that side of the chamber which joins the gas and sample inlet corner and the outlet side, and thermocouples 29 through 40 to monitor the thermal gradient at specified points in the apparatus. Using the heat source as the reference point, the outlets are referred to herein as proximal, intermediate, or distal.

As can be seen in FIGURES 2 and 3, the carrier gas inlet 10 is separated from the sample inlet and sorbent packing 25 by a diffusion grid 24. FIGURES 3 and 4 reveal that the chamber can be covered by thermal insulation 28.

The carrier gas is connected to the gas inlet 10 through a conventional pressure regulating means (not shown). A sample injection means 26, such as a hypodermic syringe, is employed which can be adapted to introduce a single slug of sample mixture or it may be fitted with a pumping means to introduce a continuous flow of sample through the diaphragm 27 of sample inlet 11. The sample outlets 13 through 23 can be equipped with suitable collecting means; such collecting means can take the form of conventional detecting apparatus such as thermal conductivity cells or may comprise suitable condensing and storing means.

Utilization of the fractionation apparatus in accordance with this invention proceeds as follows:

In FIGURE 1 an inert gas is introduced into the chamber at a controlled rate in gas inlet 10, through a diffusion grid 24 sweeping a vaporized sample mixture introduced in sample inlet 11 through the sorbent packing 25 and through a thermal gradient which is produced by heating element 12, and thence to the outlets 13 through 23 where the effluent vapor is detected and/or collected. As the vapor sample in the carrier gas passes through the sorbent packing, the less volatile and more soluble or sorptive fractions of the sample tend to remain nearer the side of the chamber fitted with the heating means 12 and ultimately flow from the proximate outlets while the more volatile and less soluble fractions tend to move away from the heating means and toward the distal outlets.

As illustrated in FIGURE 4, the chamber can be covered with a thermal insulating material 28 which can be any of the usual nonflammable insulating materials such as asbestos, fiberglass, etc. The purpose of this material is, of course, to reduce heat loss and facilitate the establishment and maintenance of a uniform thermal gradient. Although the apparatus depicted in the drawings shows a single heat source with the thermal gradient being inversely related to distance from the heat source, the thermal gradient can also be produced by a series of heating means of imparting appropriate temperatures. In any event, the heating means are preferably electrical resistance heaters.

The temperatures employed will depend upon the vapor pressure of the sample mixture components and the affinity of the sorbent to such components. Higher temperatures are, of course, employed with mixtures which contain components having higher vapor pressures.

The chamber and fittings are preferably fabricated from a relatively non-corrosive material such as copper, stainless steel, glass, etc., however, brass, aluminum, nickel, as well as alloys, laminates and platings of these metals and others well known in the art can be used.

The diffusion grid consists of an inert, porous substance such as meshed or sintered metal, e.g., stainless steel. The sorbent packing can be an adsorptive solid material such as silica gel, activated charcoal, or activated alumina; or an inert particulate solid supporting substance coated with an absorptive material (partitioning agent). A wide variety of materials are in common use as solid support in vapor fractometry and can be used in the present invention. They usually fall into one of three groups: diatomaceous earth, glass beads, and polyfluorocarbons. The coating material selected will depend largely on the problem to be solved. A number of partitioning agents are currently in general use, including polyethylene glycols, dioctyl phthalate, dinonyl phthalate, silicone fluids, etc.

Whether the sorbent packing is an adsorptive solid or an inert solid supporting substance coated with an absorptive liquid material, it must have a different physical affinity for each of the constituents to be separated in the sample. Further, these substances must not enter into chemical reaction with any of the components of the sample or otherwise cause any change in the physical and chemical properties of the chemical components. If desired, the sorbent packing can contain powdered metal to improve thermal conductivity.

As in conventional vapor fractometry, the carrier gas is preferably one which is relatively inert and when employing a thermal conductivity cell as a detection device at the chamber outlets, the choice of a particular carrier gas is made to provide maximum sensitivity by the detector. Nitrogen, helium, and argon are examples of suitable gases.

The carrier gas should be under a pressure of 5 to 50 p.s.i. and have a flow rate through the chamber of between about 1 ml. per minute to about 1 liter per minute. The preferred flow rates for carrier gas and sample mixture introduction rate is dependent on the nature of the materials to be separated and the size and capacity of the apparatus.

The following examples are illustrative of the process of this invention only and are not to be construed as limiting thereof.

EXAMPLE I

An apparatus in accordance with this invention was constructed as in FIGURE 4 having a right triangular shaped chamber, the two sides forming the right angle being 12 inches in length. The gas and sample inlets were comprised of ¼ inch diameter stainless steel tubing and eleven outlets of ⅛ inch diameter stainless steel tubing were spaced at 1 inch intervals along one side. The chamber was ¼ inch in height and was fabricated from stainless steel sheeting. The chamber was equipped along one edge with an electric resistance heater to provide a thermal gradient. The carrier gas diffusion grid was a sintered stainless steel strip and the sorbent packing consisted of 60 to 80 mesh white diatomaceous earth which had been fluxed-calcined with about 3% sodium carbonate, coated with 3.2% solution of a polyethylene glycol commercially available under the trade name "Carbowax 20M" and a 0.4% solution of potassium hydroxide, in methylene chloride.

The chamber was covered with ¾ inch asbestos thermal insulation and was provided with thermocouples which were attached at various points on the chamber as shown in FIGURE 4. The average temperatures maintained while the apparatus was in operation are set forth below with the numbers referring to those specified in FIGURE 4.

TABLE 1.—TEMPERATURE GRADIENT

| Thermocouple: | Temperature (°F.) |
|---|---|
| 29 | 151 |
| 30 | 147 |
| 31 | 155 |
| 32 | 115 |
| 33 | 110 |
| 34 | 90 |
| 35 | 92 |
| 36 | 90 |
| 37 | 85 |
| 38 | 75 |
| 39 | 73 |
| 40 | 63 |

The carrier gas employed in this example was nitrogen which was preheated to ambient temperature with the pressure adjusted to provide a flow rate of about 80 to 90 ml. per minute. Glass containers resting in an ice water bath were placed at each outlet in position to receive and condense the effluent.

Upon stabilization of the temperature pattern in the apparatus, a mixture of fatty alcohol was fed into the sample inlet at the rate of 1 ml. per hour and the effluent was collected and analyzed by standard techniques with the results set forth in Table 2 below.

TABLE 2

| | Effluent composition, percent | | | |
|---|---|---|---|---|
| | Alcohol mixture | Outlet 13 | Outlet 18 | Outlet 23 |
| Hexanol | 2.9 | | 2.8 | |
| Octanol | 52.0 | 10.2 | 68.6 | 97.3 |
| Decanol | 41.8 | 89.8 | 24.6 | |
| Hexane | 0.3 | | 0.1 | |
| Octane | 2.0 | | 2.5 | 0.9 |
| Decane | 0.9 | | 1.4 | 1.8 |

It can be seen that the fraction emitted from the proximate outlet 13 is predominantly the less volatile, more soluble decanol, with the more volatile, less soluble octanol being emitted from the distal outlet 23. The effluent from the intermediate outlet substantially corresponds to the sample mixture and can be recycled or channeled to a second apparatus or series of same to effect further separation.

EXAMPLE II

Using the apparatus described in Example I, a mixture comprising 18.0% dodecene and 82.0% 2-dodecanol was introduced at a uniform rate (3.5 ml. per hour) into the chamber. Samples of the effluent were collected for two one-hour periods at each outlet. The effluent analysis is set forth in Table 3 below.

TABLE 3

| Component | Outlet | | | | | | | | | | |
|---|---|---|---|---|---|---|---|---|---|---|---|
| | 13 | 14 | 15 | 16 | 17 | 18 | 19 | 20 | 21 | 22 | 23 |
| 1st hour: | | | | | | | | | | | |
| Percent dodecene | 31.6 | 37.9 | 30.8 | 27.5 | 45.6 | 56.4 | 66.1 | 66.0 | 80.2 | 91.6 | 96.8 |
| Percent 2-dodecanol | 68.4 | 62.1 | 69.2 | 72.5 | 54.4 | 43.6 | 33.9 | 34.0 | 19.8 | 8.4 | 3.2 |
| 2nd hour: | | | | | | | | | | | |
| Percent dodecene | 20.3 | 19.8 | 16.5 | 17.6 | 26.6 | 47.4 | 49.8 | 77.2 | 90.6 | 89.2 | 98.7 |
| Percent 2-dodecanol | 79.7 | 80.2 | 83.5 | 54.2 | 73.4 | 52.6 | 50.2 | 22.5 | 9.4 | 10.8 | 1.3 |

It can be seen that the effluent recovered at the distal outlets is substantially entirely dodecene.

EXAMPLE III

A mixture of dodecene and tetradecanol were slowly injected into the apparatus as described in the foregoing examples. The effluent collected at the distal outlets was pure dodecene while the proximal outlet effluent was greatly enriched in tetradecanol.

As will be apparent to those skilled in the art, the principles of this invention are adaptable to a wide variety of apparatus embodiments and although it has been described with reference to specific structures, no limitation is intended thereby.

Percentage values employed in the foregoing specification refer to percent by weight of the total composition.

What is claimed is:

1. A method for continuous fractionation of a mixture of substances having a differing chemical or physical properties which comprises (a) continuously passing a carrier gas stream of said mixture in vapor phase through a selective sorbent, and (b) simultaneously, maintaining a thermal gradient in said sorbent transversely through the path of the carrier gas stream of sample mixture, and (c) collecting the effluent from at least two outlets along the thermal gradient axis.

2. A method according to claim 1 wherein the sorbent is an adsorptive solid material.

3. A method according to claim 1 wherein the sorbent is an inert solid supporting material coated with an absorptive liquid.

4. Apparatus for continuous fractionation of a mixture of substances having differing chemical or physical properties which comprises a chamber containing a sorbent packing, said chamber having a configuration which permits the provision and maintenance of a thermal gradient in a path transverse to the flow of matter through the chamber, a carrier gas inlet, a sample inlet, a plurality of outlets, heating means positioned between said sample inlet and outlets to provide a thermal gradient along an axis intersecting a straight line joining said sample inlet and outlets.

5. The apparatus of claim 4 wherein the sorbent packing is an adsorptive solid material.

6. The apparatus of claim 4 wherein the sorbent packing is an inert solid supporting material covered with an absorptive liquid.

7. Apparatus for continuous fractionation of a mixture of substances having differing chemical of physical properties which comprises a chamber having an essentially right triangular configuration, a sorbent packing within said chamber, a carrier gas inlet and a sample inlet at one corner of said chamber, a plurality of effluent outlets on the side of said chamber opposite said inlets, and a heating means positioned along another side of said chamber.

References Cited

UNITED STATES PATENTS 3,118,947 1/1964 Amir _____ 55—67 X
3,407,574 10/1968 Perkins et al. _____ 55—386

JAMES L. DECESARE, Primary Examiner